United States Patent
Matoba et al.

(10) Patent No.: US 7,826,850 B2
(45) Date of Patent: *Nov. 2, 2010

(54) FREQUENCY BAND ALLOCATION DEVICE AND METHOD

(75) Inventors: Naoto Matoba, Fujisawa (JP); Hitoshi Yoshino, Yokosuka (JP); Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 163 days.

This patent is subject to a terminal disclaimer.

(21) Appl. No.: 11/232,023

(22) Filed: Sep. 22, 2005

(65) Prior Publication Data

US 2006/0063533 A1    Mar. 23, 2006

(30) Foreign Application Priority Data

Sep. 22, 2004    (JP) .............................. 2004-275586

(51) Int. Cl.
    H04B 1/18    (2006.01)
(52) U.S. Cl. .................... 455/450; 455/452.2; 455/453; 455/454
(58) Field of Classification Search ................. 455/450, 455/452.2, 453, 454
    See application file for complete search history.

(56) References Cited

U.S. PATENT DOCUMENTS

| | | | |
|---|---|---|---|
| 6,341,145 B1 * | 1/2002 | Hioe et al. | 375/256 |
| 6,516,184 B1 * | 2/2003 | Damgaard et al. | 455/86 |
| 6,650,655 B2 * | 11/2003 | Alvesalo et al. | 370/468 |
| 7,233,771 B2 * | 6/2007 | Proctor et al. | 455/11.1 |
| 2002/0055360 A1 * | 5/2002 | Chen et al. | 455/452 |
| 2002/0102977 A1 * | 8/2002 | Shi | 455/437 |
| 2004/0203815 A1 * | 10/2004 | Shoemake et al. | 455/450 |

FOREIGN PATENT DOCUMENTS

| | | |
|---|---|---|
| EP | 1 198 093 A2 | 4/2002 |
| JP | 2004-179693 | 6/2004 |
| JP | 2004-186923 | 7/2004 |
| WO | WO 02/23758 A1 | 3/2002 |
| WO | WO 02/32163 A2 | 4/2002 |
| WO | WO 2002/073366 A2 | 9/2002 |
| WO | WO 2002/073366 A3 | 9/2002 |

OTHER PUBLICATIONS

U.S. Appl. No. 11/231,794, filed Sep. 22, 2005, Matoba, et al.
U.S. Appl. No. 11/232,009, filed Sep. 22, 2005, Matoba, et al.
U.S. Appl. No. 11/232,018, filed Sep. 22, 2005, Matoba, et al.

* cited by examiner

*Primary Examiner*—Patrick N Edouard
*Assistant Examiner*—Julio Perez
(74) *Attorney, Agent, or Firm*—Oblon, Spivak, McClelland, Maier & Neustadt, L.L.P.

(57) ABSTRACT

A frequency band allocation device is disclosed. The frequency band allocation device comprises a frequency band selection unit (1161, 1162) for selecting usable frequency bands from a dedicated frequency band, a registered frequency band and an unlicensed frequency band; and a frequency band allocation unit (1163) for allocating a frequency band out of the selected usable frequency bands to an uplink and downlink, so as to satisfy user required QoS.

9 Claims, 7 Drawing Sheets

US 7,826,850 B2

FREQUENCY BAND ALLOCATION DEVICE AND METHOD

BACKGROUND OF THE INVENTION

The present invention generally relates to a frequency band allocation device and a frequency band allocation method employed in mobile communications systems in which plural frequency bands are utilized for plural communications systems.

Nowadays, the technology area for radio communication systems is developing from conventional telecommunications to a variety of schemes such as Bluetooth and radio LAN. For example, a short distance connection such as a several centimeter distance connection was done by a cable in the past, but recently radio connection technology for such short distances has been under development.

In general, radio communications systems at present, in the same area and same time, employ a single worldwide standard system, such as GSM (Global System for mobile Communications) or IMT-2000 (International Mobile Telecommunication 2000). However, in the future, required communication systems will be diversified depending on their purposes per area and operators. In this situation, plural different systems each of which has a different purpose should be co-mingled in the same time and the same area. For that purpose, mobile stations and base stations should be compatible with these different systems.

Conventionally, a single radio device can be connected to a dedicated single network. Currently, by having several different kinds of software, a single hardware radio device can be adaptively connected to different networks. Reconfigurable radio devices are also being developed.

On the other hand, application oriented communications are required. It is tedious for users to select a radio communication route per application, and therefore a radio device is required to automatically select the optimum radio communication route for each application.

A radio communication device executing different characteristic applications is known, which can select one of plural radio communications systems for each application, based on the application's characteristics, and can determine a frequency band to be used in the selected radio communications system. Such a device is disclosed in Japanese Patent Laid-open Application No.2004-179693.

However, most part of spectrum has already been allocated to various radio communication systems, and therefore it is difficult to obtain new spectrum for new radio communications systems.

When new and existing systems have to co-exist during a transition period in the same operator's service, it is required to establish a co-exist control system and method for smoothly transferring from the old system to the new system. In a case where different generation systems co-exist, for example, while a mobile communications system is transferred from the second generation system to the third generation system in the same frequency bands, one frequency band is shared by plural systems. In this case, it is required to establish a control system and method for allowing plural systems to co-exist. It is also required to establish a control system and method for allowing different operators such as public telecommunication operators, broadcasting operators, etc., to co-exist.

In the future, radio governmental policy regarding frequency band allocation may be changed from the license system in which operators exclusively utilize their licensed frequency bands to the registration system in which any registered operators satisfying certain standards can share and utilize certain frequency bands.

Frequency bands allocated by the registration system may be utilized by other operators, and therefore it is required to establish an efficient signal transmission system which can avoid interference from and to other systems.

It is also difficult to obtain a continuous broad bandwidth. When a high speed transmission is required, a broad bandwidth is needed, but broad bandwidth is no longer available in spectrum which is suitable for radio communication.

Since only fragmented frequency bands are available, it is required to establish a multi-band signal transmission technology and an optimum traffic allocation method in order to utilize the fragmented frequency bands. For example, a method for separately allocating frequency bands per each use and a method for controlling resources are required to be established.

When a user uses one application selected from a variety of applications such as voice, video and data communications, the user side selects a radio system suited for the application within available radio systems. Accordingly it is difficult for operators to allocate radio systems to maximize the frequency utilization factor.

SUMMARY OF THE INVENTION

An object of the present invention is to provide a frequency band allocation device and a frequency band allocation method in which plural frequency bands can be utilized and transmission information can be allocated differently to an uplink and downlink depending on frequency characteristics.

The above object of the present invention is achieved by a frequency band allocation device comprising: a frequency band selection unit for selecting usable frequency bands from a dedicated frequency band, a registered frequency band and an unlicensed frequency band: and a frequency band allocation unit for allocating a frequency band out of the selected usable frequency bands to an uplink and downlink, so as to satisfy user required QoS.

The above object of the present invention is also achieved by a frequency band allocation method comprising the steps of: selecting usable frequency bands based on user information and frequency category information indicating a dedicated frequency band, a registered frequency band or unlicensed frequency band; and allocating to an uplink and downlink, a frequency band satisfying user required QoS out of the selected usable frequency bands.

According to an embodiment of the present invention, it is possible to realize a frequency band allocation device and a frequency band allocation method employed in mobile communications systems in which plural frequency bands are utilized for plural communications systems.

DESCRIPTION OF THE PREFERRED EMBODIMENTS

Figure 1:
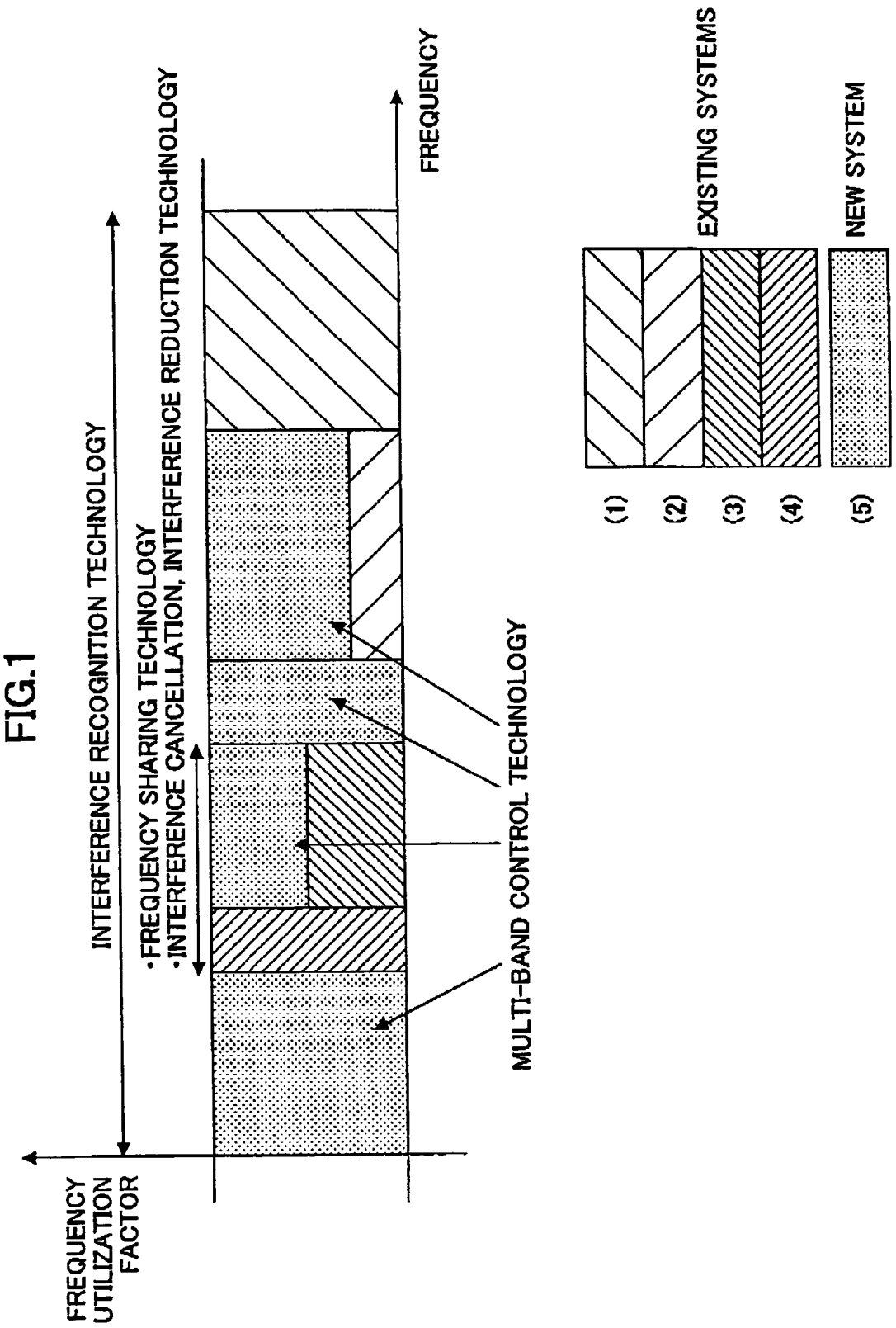
FIG. 1 is a graph for explaining frequency utilization technology relating to an embodiment of the present invention.

The following is a description of embodiments of the present invention, with reference to the accompanying drawings.

Throughout all the figures, members and parts having the same or similar functions are assigned the same or similar reference numerals or symbols, and redundant explanations are omitted.

A frequency band allocation device according to embodiments of the present invention is explained below with reference to FIGS. 1 and 2.

First, frequency usage technology is explained with reference to FIG. 1.

Figure 2:
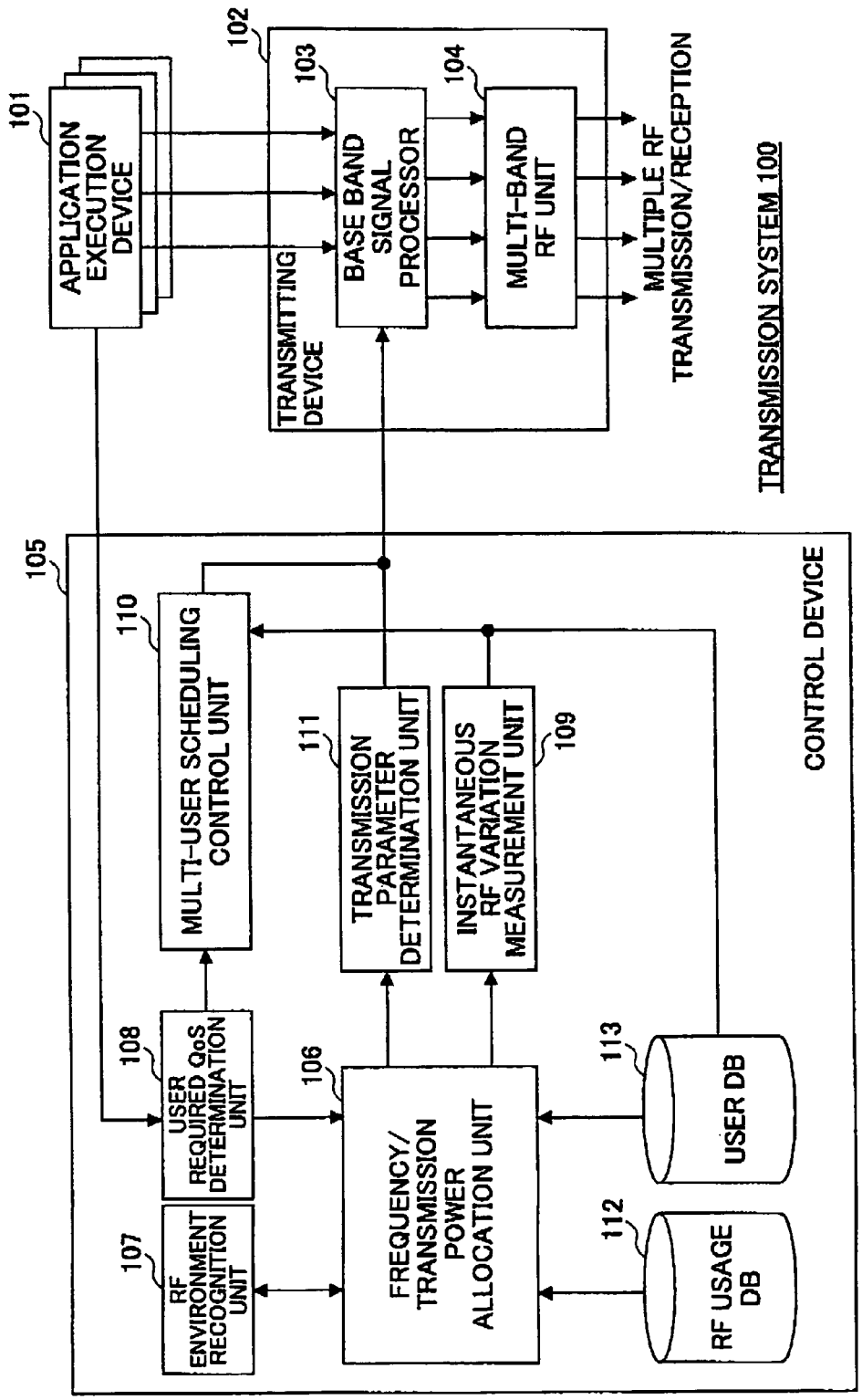
FIG. 2 is a block diagram of a communication system according to the embodiment of the present invention.

In a graph shown in FIG. 1, the horizontal axis shows frequency and the vertical axis shows frequency utilization factor or frequency efficiency.

In this case, frequency bands indicated by (1)~(4) have been already allocated to existing systems. When a new system is started, all the remaining frequency band capacity is allocated to the new system to maximize the frequency utilization factor.

The frequency band allocation is done by the following schemes. The same frequency band is allocated to and shared by the existing systems and the new system; plural frequency bands are used in one system; and one frequency band is shared by plural new systems.

Under the situation where frequency bands utilized by one communication service operator and frequency bands utilized by another communication service operator co-exist co-mingled, the frequency band allocation device according to the embodiments of the present invention adaptively controls and utilizes all the remaining open frequency bands to maximize the frequency utilization factor by employing interference recognition technology, frequency sharing technology, interference cancellation technology, interference canceling technology and multi-band control technology.

Next, a communication system 100 according to this embodiment is explained with reference to FIG. 2.

The communication system 100 is placed in, for example, a mobile station or a base station or both. The communication system 100 comprises an application execution device 101, a transmitting device 102 coupled to the application execution device 101, and a control device 105 coupled to the transmitting device 102.

The transmitting device 102 comprises a base band signal processor 103 coupled to the application execution device 101 and a multi-band RF unit 104 coupled to the base band signal processor 103.

The control device 105 comprises a frequency/transmission power allocation unit 106, an RF environment recognition unit 107 coupled to the frequency/transmission power allocation unit 106, a user required QoS determination unit 108, a transmission parameter determination unit 111, an instantaneous RF variation measurement unit 109, an RF usage DB 112, a user DB 113, and a multi-user scheduling control unit 110 coupled to the base band signal processor 103. The transmission parameter determination unit 111 is connected to the base band signal processor 103, and the user required QoS determination unit 108 is connected to the application execution device 101.

The frequency/transmission power allocation unit 106, the RF usage DB 112 and the user DB 113 constitute the frequency band allocation device.

When two mobile stations start communications with each other, or a mobile station starts communications with a server, the application execution device 101 of the communication system 100 sends a transmission request to the other mobile station or the server.

The application execution device 101 includes a variety of applications and executes these applications to perform voice communication, video communication and data transmission, etc.

Upon receiving data transmitted through a network from the mobile station or the server to communicate with, the base station inputs the data to the base band signal processor 103.

The mobile station executes a predetermined application among applications stored in the communication system, and inputs digitized transmission data to the base band signal processor 103.

The base band signal processor 103 in each of the base station and the mobile station selects a transmitting frequency and time per user (multi-scheduling). Depending on RF transmission condition of the used frequency and time, adequate error correction, interleaving, modulation and transmission power are selected as parameters. Input data are transformed to base band signals using these selected parameters, and input to the multi-band RF unit 104. The multi-band RF unit 104 transforms the input base band signals to plural frequency band RF signals, and the transformed signals are transmitted and received.

The control device 105 is explained below.

The frequency/transmission power allocation unit 106 allocates one or more frequency bands and transmission power levels to each user. It is possible to allocate different frequency bands to uplink and downlink, or allocate different frequency bands to control signals and data signals.

The RF environment recognition unit 107 recognizes the current status of frequencies that can be used by each user. For example, at least one item is detected among utilizable frequency bands and bandwidths out of available frequency bands, parameters of other systems utilizing frequencies usable by each user, interference from other systems, transmission loss and shadowing, etc.

The user required QoS determination unit 108 determines at least one necessary item per application, among an average transmission data rate, a delay (average delay, maximum delay jitter, etc.), a frame error rate, a transmission power level, the maximum transmission data rate and the minimum guaranteed transmission data rate. These QoS information items are input from the application execution device 101.

In this embodiment, QoS includes an average transmission data rate, a delay (average delay, maximum delay jitter, etc.), a frame error rate, a transmission power level, the maximum transmission data rate and the minimum guaranteed transmission data rate.

The instantaneous RF variation measurement unit 109 measures instantaneous variations of the desired signal and interference signals due to fading in frequency and time, in the used channel.

The multi-user scheduling control unit 110 performs scheduling for multi-users. The scheduling is performed in both dimensions of frequency and time.

The transmission parameter determination unit 111 determines parameters, which are used in the base band processor 103 for transforming user data to transmission series. More specifically, parameters relating to coding rate, interleaving, modulation transmission power control method, etc., are determined.

The RF usage DB (data base) 112 stores categories of frequencies; more specifically, frequency bands (dedicated frequency bands) allocated to each mobile communication service operator, frequency bands (registered frequency bands) that can be utilized by plural registered operators, and frequency bands (unlicensed frequency bands) that can be utilized by anyone satisfying legal conditions. For example, information on frequency category indicating ISM (Industry Science Medical) bands is stored in the RF usage DB 112. As for the registered frequency bands and unlicensed frequency bands, the requirements in using the frequency bands such as transmission power limitations are also stored in the RF usage DB 112.

The user DB (data base) 113 stores categories of users, for example information on usage priority, for example, plans for use for each frequency band, transmission capability, transmission power limitations, signal processing capability, usable RF of mobile stations, etc.

Figure 3:
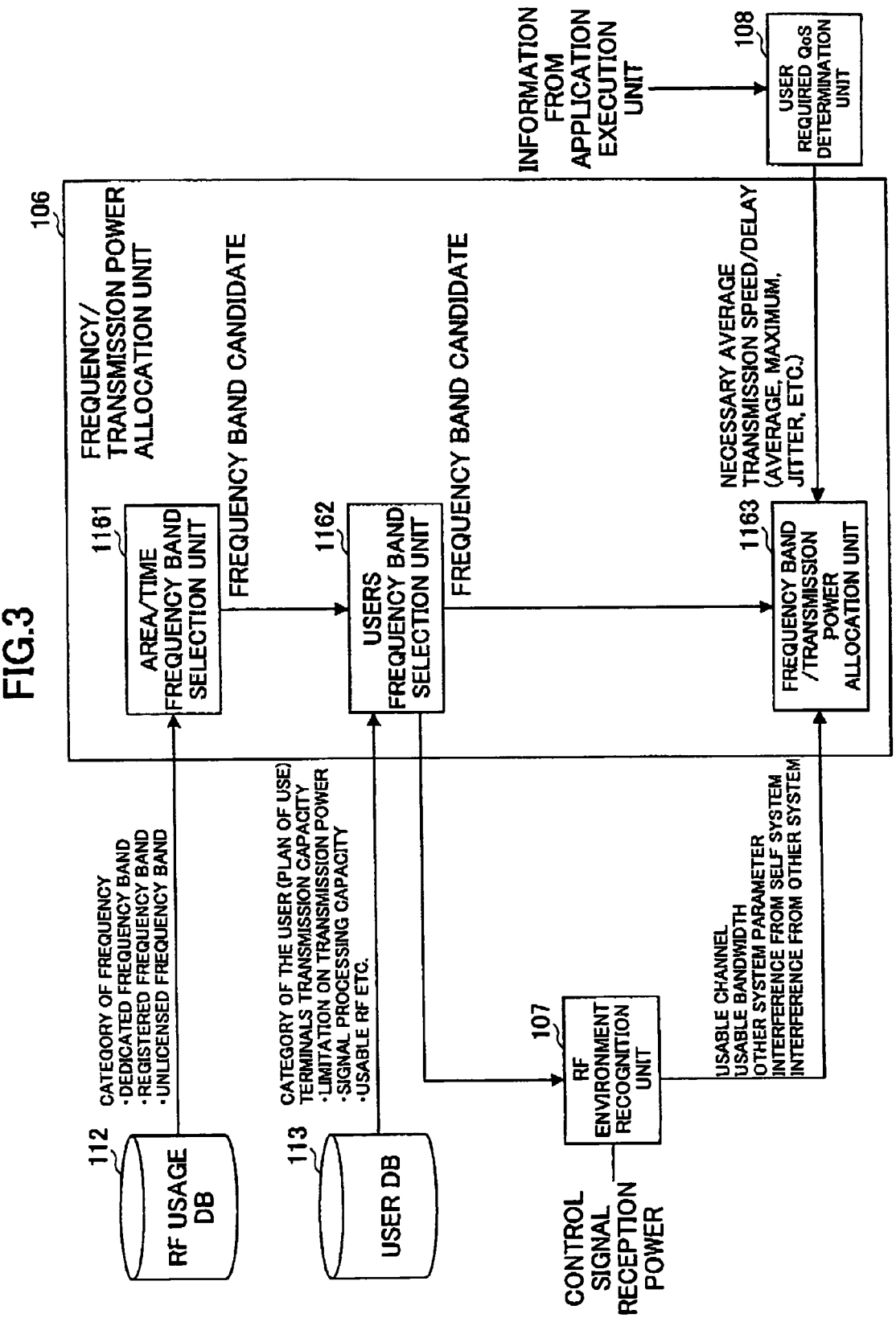
FIG. 3 is a block diagram of a frequency/transmission power allocation device according to the embodiment of the present invention.

The frequency/transmission power allocation unit 106 is explained below with reference to FIG. 3.

The frequency/transmission power allocation unit 106 comprises an area/time/frequency band selection unit 1161 coupled to the RF usage DB 112, a user's frequency band selection unit 1162 coupled to the area/time/frequency band selection unit 1161, the RF environment recognition unit 107, and the user DB 113. The frequency/transmission power allocation unit 106 further comprises a frequency band/transmission power allocation unit 1163 coupled to the user's frequency band selection unit 1162, the RF environment recognition unit 107 and the user required QoS determination unit 108. The area/time/frequency band selection unit 1161 and the user's frequency band selection unit 1162 constitute a frequency band selection unit.

Last, the area/time/frequency band selection unit 1161 reads category information of frequency bands from the RF usage DB 112, and out of the read category information of frequency bands, selects frequency bands that can be utilized by the service operators in the area and time.

Frequency bands are classified into three categories, that is, dedicated frequency bands, registered frequency bands and unlicensed frequency bands. From the RF usage DB 112 storing the category information of frequency bands, user utilizable frequency bands are selected.

For example, the registered frequency bands can be utilized for a variety of services by plural service operators. Therefore, the registered frequency bands can be efficiently used by avoiding interference in area and time to improve the frequency utilization factor.

For example, frequency bands used for broadcasting are used in some areas but not used in other areas, and not used late at night while the broadcasting is not on-air. Therefore such frequency bands used for broadcasting have much different utilization factors from area to area, and from time to time. Then communication service operators can utilize such broadcasting frequency bands while avoiding interference to the broadcasting to make effective use of the frequency resources.

Figure 4:
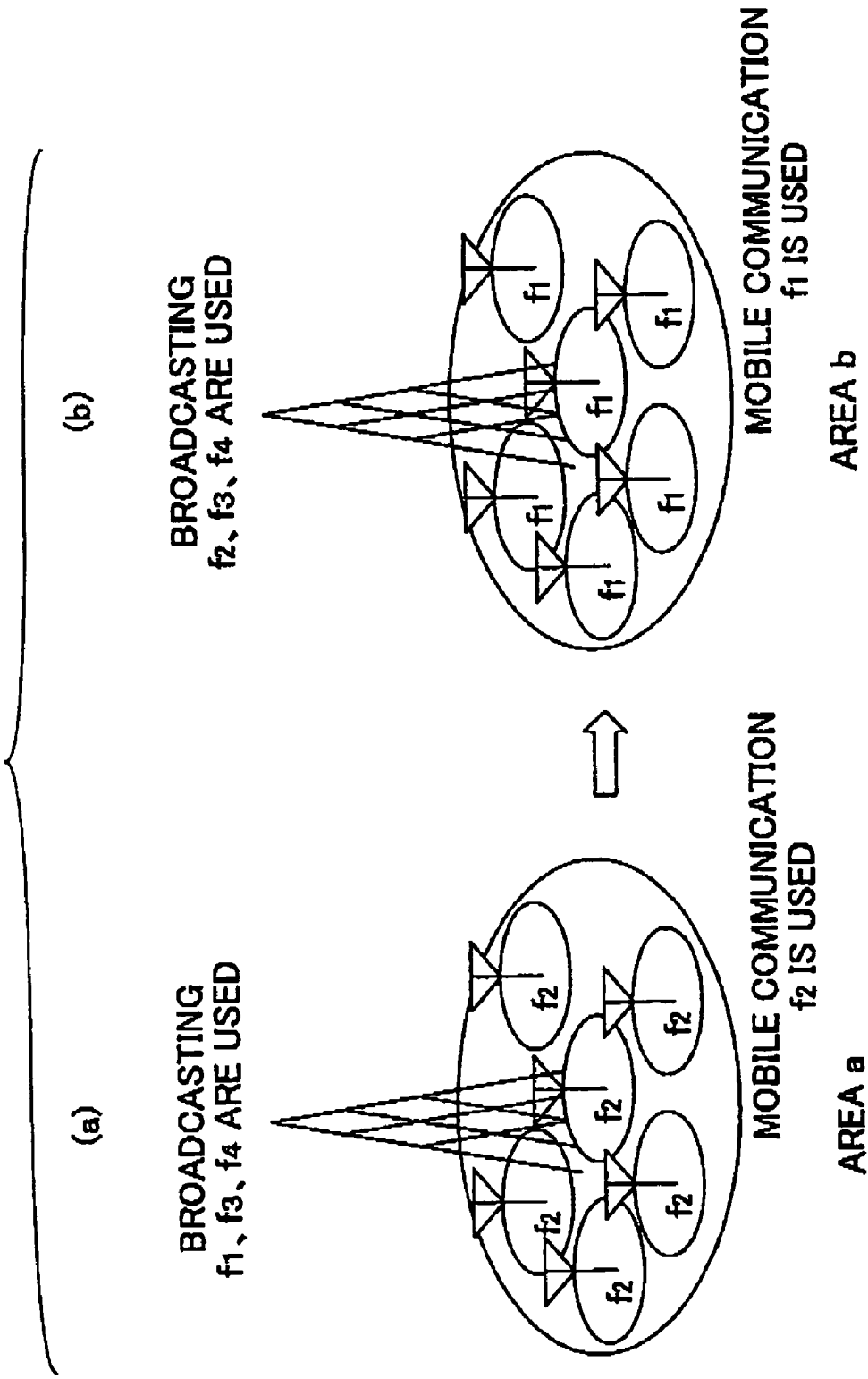
FIG. 4 schematically shows plural systems co-existing in one area.

As shown in FIG. 4(a), in an area a where frequency bands f1, f3 and f4 are utilized for broadcasting, a frequency band f2 can be utilized for mobile communication. On the other hand, in an area b shown in FIG. 4(b), since frequency bands f2, f3 and f4 are utilized for broadcasting, a frequency band f1 can be utilized for mobile communication. In this manner, frequency bands can be adaptively selected and utilized to make efficient use of the frequency resources.

Frequency bands which are normally not utilized but reserved for very important systems such as disaster control radio communications can also be utilized by having a mechanism for avoiding the existing important systems.

The area/time/frequency band selection unit 1161 inputs information on the selected frequency bands to the user's frequency band selection unit 1162.

The user's frequency band selection unit 1162 reads user information such as user category information and transmission capability information, and based on the read user information, selects frequency bands utilizable by the user among the input frequency bands.

In ubiquitous communications, there are a variety of mobile terminals, and their performance levels and capabilities are not identical. For example, mobile terminals with high processing capability can perform signal processing over broad radio areas. mobile terminals having large battery capacitance can make transmission power strong, and may have high performance radio circuits and utilize different radio frequencies at the same time.

On the other hand, a small mobile station with low processing capability such as a sensor, has a low signal processing capability, and therefore cannot accommodate broadband signals. Such a small mobile station has a small battery capacity and therefore has a small transmission power level and a limited scale of radio circuit, and further usable RF is limited due to antenna and radio circuit limitation. Based on this kind of information, usable frequency band selection is further limited.

In the registered frequency bands and the unlicensed frequency bands, their communication environments may be degraded due to interference by other operators. Therefore, the user's frequency band selection unit 1162 allocates these frequency bands to best effort applications or low priority users such as users having cheap plans of use. The "best effort" means allocating to mobile stations the maximum transmission data rate which can be made available at present. The user's frequency band selection unit 1162 allocates dedicated frequency bands to real time application users such as voice, video or high priority users such as users having an expensive plan of use.

The user's frequency band selection unit 1162 inputs selected frequency band information to the frequency band/transmission power allocation unit 1163 and inputs them also to the RF environment recognition unit 107.

The RF environment recognition unit 107 detects control signals or reception power in the input frequency band information, and detects the current status of each frequency band. More specifically, the RF environment recognition unit 107 collects information on utilizable frequency bands and bandwidths among frequencies available to each user, parameters of other systems utilizing frequencies usable by each user, interference level from own system to other systems, interference levels from other systems, required transmission power level, transmission loss and shadowing. The RF environment recognition unit 107 inputs the collected RF environment condition to the frequency band/transmission power allocation unit 1163.

On the other hand, the application execution device 101 inputs QoS information per application to the user required QoS determination unit 108. The user required QoS determination unit 108, based on the input QoS, determines at least one necessary item per application, among an average transmission data rate, a delay (average delay, maximum delay jitter, etc.), a frame error rate, a transmission power level, the maximum transmission data rate, and the minimum guaranteed transmission data rate. The user required QoS determination unit 108 inputs the determined item to the frequency band/transmission power allocation unit 1163.

Real time communications have a small tolerance against delay, which may be accepted by some applications. For example, in a voice communication system, when an error is detected, muting is carried out to prevent the user from noticing the quality degradation, and therefore certain level of frame error can be accepted.

On the other hand, in data transmission, since delay is acceptable to some extent, frame error rate can be reduced to wired communication level by performing retransmission control.

The frequency band/transmission power allocation unit 1163, based on the status of utilizable frequency bands sent from the RF environment recognition unit 107 and the QoS determination information sent from the user required QoS determination unit 108, selects frequency bands and bandwidths to be allocated to each user, and calculates required average transmission power. For example based on transmission characteristics or available bandwidths of used plural frequency bands, allocation is done so as to satisfy a variety of required QoSs from high rate to low rate.

Frequency characteristics are explained.

High frequency bands give broadband allocation, but have large transmission loss. Therefore, when utilizing them for uplink, it is required to have large transmission power level for mobile terminals, resulting in usable area becomes smaller. On the other hand, low frequency bands give narrowband allocation, but have small transmission loss. Therefore, it is possible to have stable communication even without large transmission power.

The frequency band/transmission power allocation unit 1163 selects a frequency band(s) while satisfying user required QoS (transmission data rate, delay, error rate) and the maximum allowable transmission power by the terminal, and maximizes the frequency utilization factor over the whole system and further maximizes the service coverage area with the acceptable transmission power.

As for dedicated frequency bands that can be controlled by owning service operators, their transmission power is calculated based on service operator's acceptable interference power. As for registered frequency bands that can only be used by registered service operators, their transmission power is calculated in accordance with interference avoidance rules defined among the service operators. As for unlicensed frequency bands that can be utilized by anyone, legally stipulated transmission power is utilized.

For example, the frequency band/transmission power allocation unit 1163, based on the interference reception power sent from the RF environment recognition unit 107, calculates necessary transmission power for each user.

Based on the QoS information input from the user required QoS determination unit 108 that is QoS required by the user, the frequency band/transmission power allocation unit 1163 allocates low frequencies to distant users or users wanting a wide service area, and allocates high frequencies to users wanting high speed transmission or broadband transmission.

Here, where there is no continuous frequency band satisfying user's required bandwidth, it is possible to select and allocate plural utilizable frequency bands to one user. If there are plural frequency bands satisfying requirements, allocation can be done so as to spread frequency loads estimating traffic condition. Frequency bands can be allocated so as to minimize transmission power level in order to reduce interference and improve frequency utilization factor. Frequency bands can be allocated so that transmission power level satisfies a predetermined value.

Since the RF environment varies continuously, the selected frequency band can be altered depending on the change of the environment. Therefore, it is possible to periodically select frequency bands or select frequency bands per call or packet.

The frequency band/transmission power allocation unit 1163 can select different frequency bands for uplink and downlink. In some applications such as data transmission, downlink traffic from a server may be multiple times larger than uplink traffic to the server. Data information amount becomes several times or several dozen times larger than control information amount for maintaining communication.

In best effort type data communication, delay demand is not so strict than real time communication. Therefore, enough throughputs can be attained even via erroneous communication route by performing retransmission control. However, if feedback information used for retransmission has errors, delay is increased and throughputs are degraded.

In this case, by selecting asymmetric bandwidths for an uplink and downlink, asymmetric traffic can be efficiently accommodated.

Some mobile stations have small available transmission power. In this case, by allocating a low frequency band having small transmission loss to its uplink, it is possible to keep low power consumption of the mobile terminal while maintaining an available broad service area.

The control information includes information necessary for maintaining communication and feedback information for retransmission. Therefore, if transmission error occurs, it is impossible for a receiver side to recover data even without data information error. Accordingly, it is required to minimize transmission error.

The frequency band/transmission power allocation unit 1163 can select different frequency bands for uplink and downlink. In some applications such as data transmission, downlink traffic from a server may be multiple times larger than uplink traffic to the server. In this case, such asymmetric traffic can be efficiently accommodated by selecting asymmetric frequency bandwidths.

For example, in a case where broadband high frequency and narrowband low frequency can be utilized at the same time, uplink and downlink control channels and uplink data channel are allocated to the narrowband low frequency band and downlink data channel is allocated to the broadband high frequency band. In this manner, it is possible to increase the downlink transmission capability with maintaining wide coverage area.

The information such as thus selected frequency bands, bandwidths and transmission power level is input to the transmission parameter determination unit 111. For example, as for data signals and control signals, the information such as the selected frequency bands, bandwidths and transmission power is input to the transmission parameter determination unit 111.

The transmission parameter determination unit 111, based on the input information such as the used frequency band, bandwidth and transmission power, determines parameters used in the base band signal processor 103 transforming the transmission data to transmission series, and inputs the determined parameters to the base band signal processor 103.

The base band signal processor 103 uses the input parameter and performs error correction coding, interleaving, modulation, transmission power control, multi-user scheduling per user, and inputs plural frequency band signals to the multi-band RF unit 104. For example, the multi-user scheduling is performed in dimensions of both frequency and time. When the scheduling is done in the frequency dimension, the allocated frequencies that are apart from each other can be controlled separately, and the allocated frequencies that are close to each other can be controlled together.

The multi-band RF unit 104 uses the allocated frequency bands to transmit data. For example, one RF unit having a software radio function can be utilized by changing parameters for each frequency or different subunits are prepared and used by switching for different frequency bands.

Figure 5:
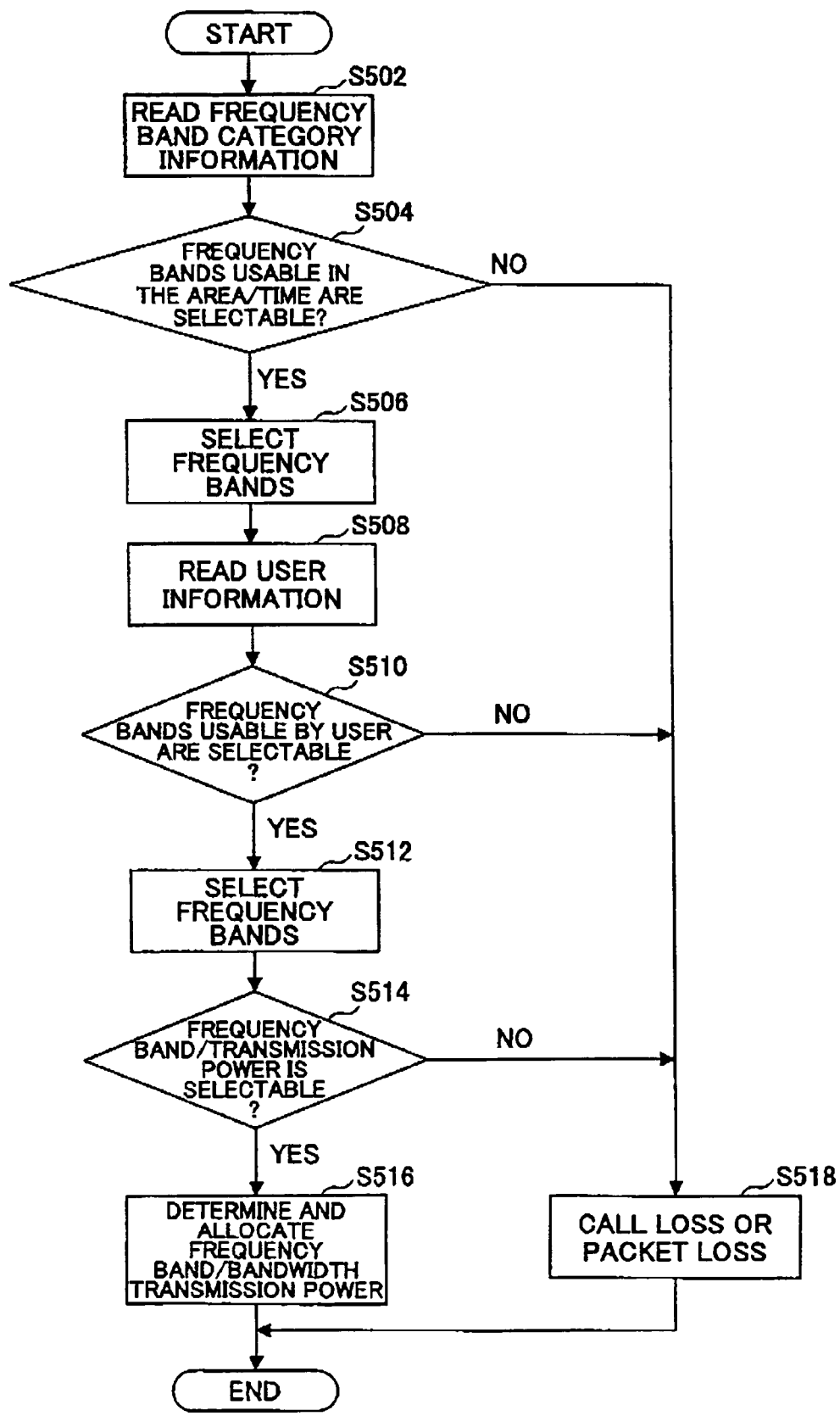
FIG. 5 is a flowchart illustrating an operational procedure of the communication system according to the embodiment of the present invention.

Next, the operation of the communication system 100 according to this embodiment is explained with reference to FIG. 5.

At first, frequency category information is read from the RF usage data base 112 at step S502.

Based on the read frequency category information, it is determined whether the service operator can select frequency bands that can be used in the area and time at step S504. If available frequency bands can be selected (YES at step S504), frequency bands are selected at step S506. On the other hand, if available frequency bands cannot be selected (NO at step S504), the procedure goes to callo blocking for voice communication or packet loss for data transmission at step S518.

Figure 6:
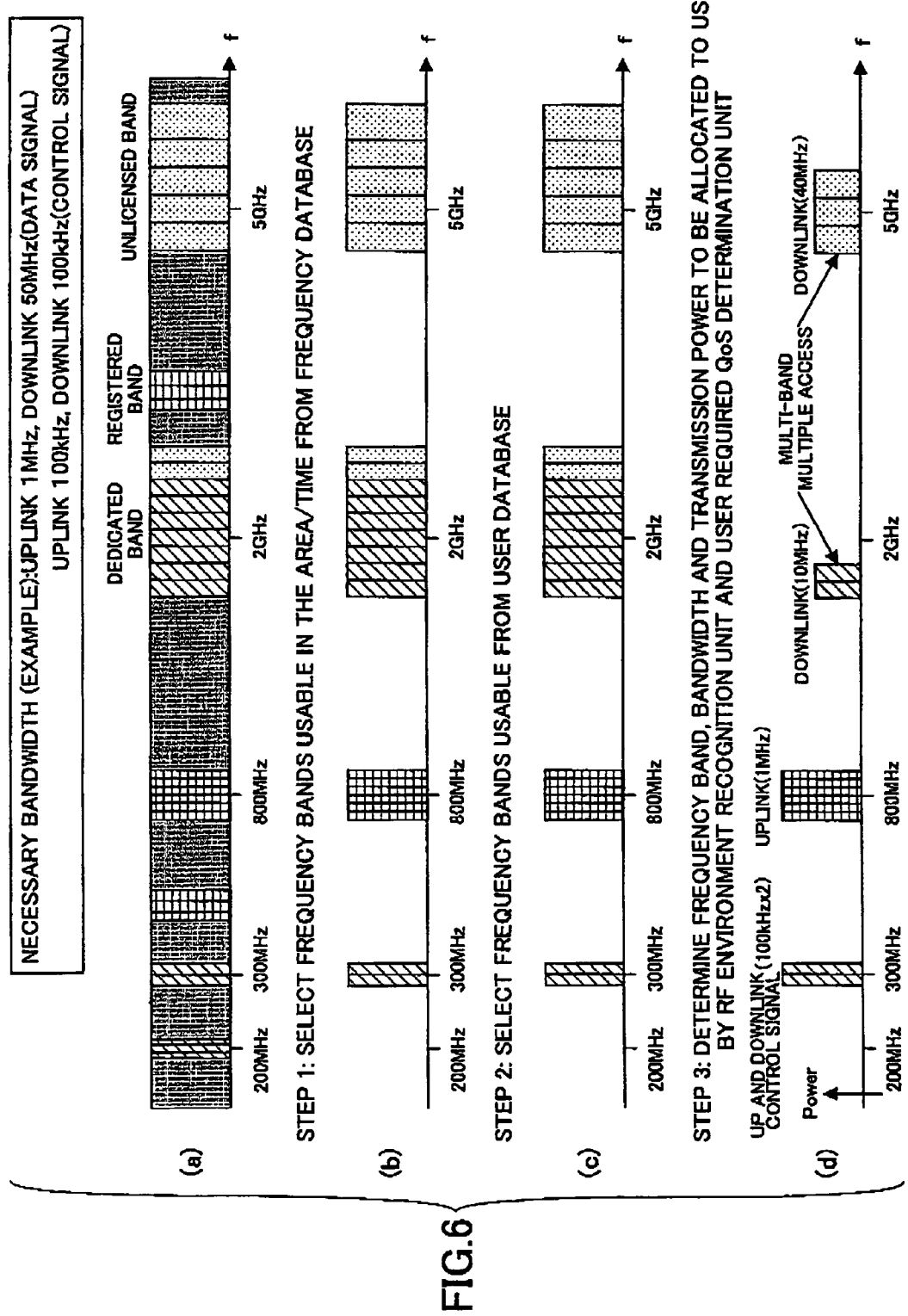
FIG. 6 is an explanatory view for illustrating frequency selection according to the embodiment of the present invention.

For example, the RF usage database 112 stores frequency category information such as dedicated frequency bands, registered frequency bands and unlicensed frequency bands shown in FIG. 6(*a*). After reading the frequency category information, the area/time/frequency band selection unit 1161 selects frequency bands that can be used in the area and time. For example, 300 MHz band, 800 MHz band, 2 GHz band and 5 GHz band shown in FIG. 6(*b*) are selected as available frequency bands.

Next, user information is read from the user database 113 at step S508. Based on the read user category information, it is determined at step S510 whether it is possible to select utilizable frequency bands out of the frequency bands selected at step S506.

If it is possible to select utilizable frequency bands (YES at step 510), utilizable frequency bands are selected at step S512. On the other hand, it is impossible to select utilizable frequency bands (NO at step S510), the procedure goes to call blocking for voice communication or packet loss for data transmission at step S518.

For example, the user's frequency band selection unit 1162 selects frequency bands the same as the input frequency band candidates as shown in FIG. 6(*c*).

Based on at least one item of usable channels, available bandwidths and parameters of other system utilizing usable frequency bands, interference from other system, transmission loss and shadowing input from the RF environment recognition unit 107, or based on at least one item of an average transmission data rate, delay information, a frame error rate transmission power level, the maximum transmission data rate, and the lowest guaranteed transmission data rate that are necessary per application and input from the user required QoS determination unit 108, it is determined whether the frequency band/transmission power allocation unit 1163 can select frequency bands/transmission power levels to be used per user at step S514. If it is possible to select utilizable frequency bands/transmission power levels (YES at step S514), frequency bands, bandwidths and transmission power levels are determined and the frequency bands are allocated at step S516.

For example, as shown in FIG. 6(*d*), the 300 MHz band, 800 MHz band, 2 GHz band and 5 GHz band are allocated. If there is no continuous frequency band having a bandwidth satisfying user's request, it is possible to allocate plural utilizable frequency bandwidths to one user. Different frequencies can be allocated to data signals and controls signals. On the other hand, if it is impossible to select frequency band/transmission power level to be used (NO at step S514), the procedure goes to callo blocking for voice communication or packet loss for data transmission at step S518.

Figure 7:
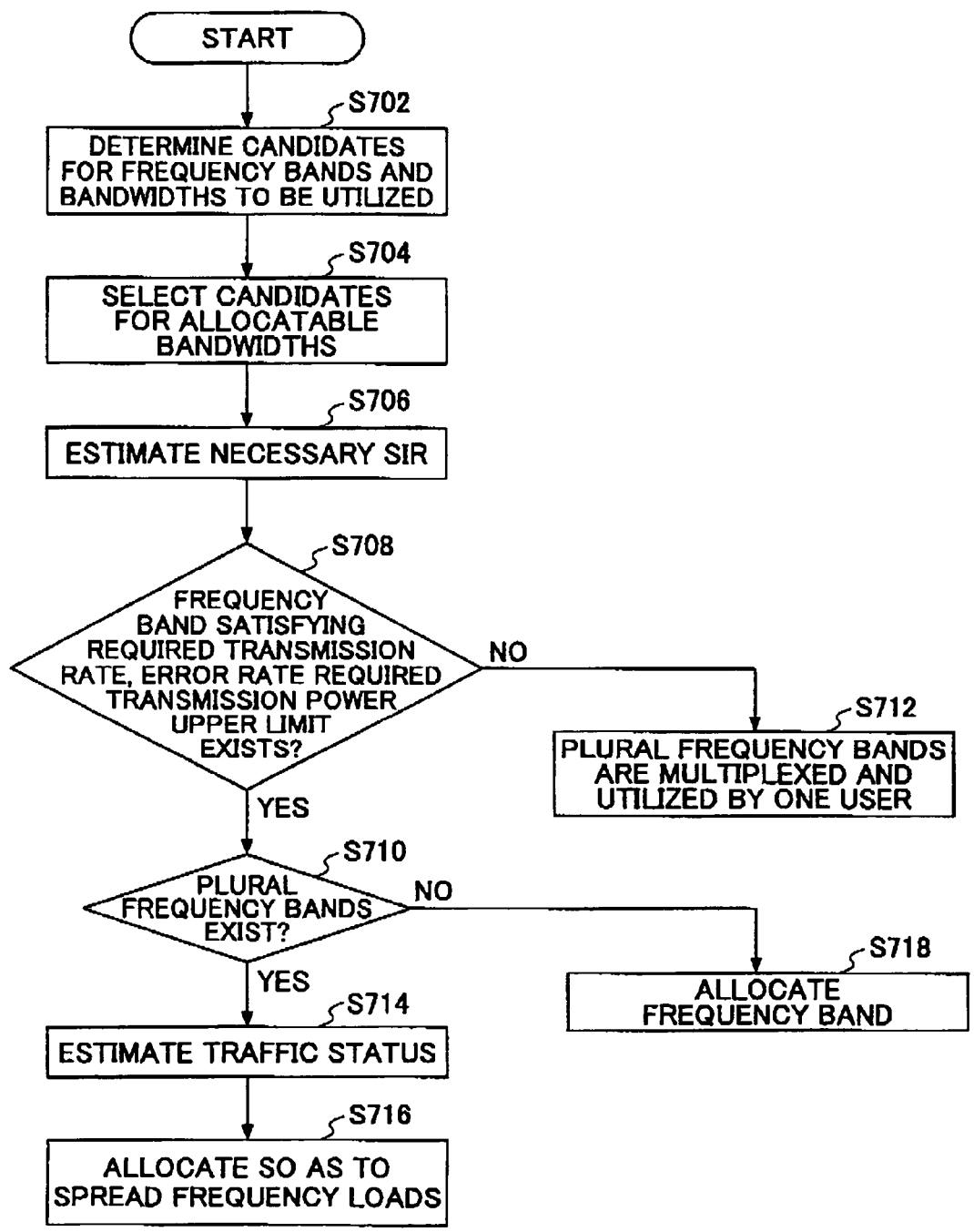
FIG. 7 is a flowchart illustrating an operational procedure of the communication system according to the embodiment of the present invention.

Next, a frequency band allocation procedure performed in the frequency band/transmission power allocation unit 1163 is explained with reference to FIG. 7.

At first, in response to user's connection request, surrounding RF utilization status input from the RF environment recognition unit 107 is recognized, and utilizable frequency bands are searched among frequency bands available to his mobile terminal to determine candidates for frequency bands and bandwidths to be utilized at step S702.

Next, transmission rate (requested by the user) input from the user required QoS determination unit 108 and available frequency bandwidths are compared, and allocatable bandwidth candidates are selected among the candidates for frequency bands and bandwidths at step S704.

A necessary SIR is estimated at step S706, and it is determine whether frequency band satisfying required transmission rate, error rate and required transmission power upper limit exists at step S708.

If a frequency band satisfying the requirements exists (YES at step S708), then it is determined whether plural frequency bands satisfying the requirements exist at step S710. On the other hand, no frequency satisfying the requirements exists (NO at step S708), plural frequency bands are multiplexed and allocated so that one user can utilize them at the same time at step S712.

At step S710, if plural frequency bands satisfying the requirements exist (YES at step S710), traffic status is estimated at step S714 and frequency bands are allocated so as to spread frequency loads at step S716.

In order to improve frequency utilization factor by reducing interference, it is possible to select frequency bans so as to minimize transmission power level.

On the other hand, only one frequency band satisfying the requirements (NO at step S710), the frequency band is allocated at step S718.

According to this embodiment of the present invention, since service operators can utilize dedicated plural frequency bands other than already allocated frequencies, it is possible to flexibly deal with heavy traffic occurrence with uneven time distribution and uneven area distribution. It is also possible to allocate plural frequency bands to one system.

It is possible to satisfy user required QoS, maximize the frequency utilization factor over the whole system and keep power consumption low while maintaining a wide service area, and therefore realize mobile terminals that can be used in any area.

Since the control channel is transmitted without error, it is possible minimize overhead such as necessary transmission power and channel coding and provide stable data communication with maintaining wide coverage area.

In a communications system in which plural frequency bands can be utilized, a variety of mobile terminals can be accommodated while satisfying a variety of QoSs (such as transmission rate, error rate, etc.), which are different depending on different frequency characteristics, users, an uplink and downlink.

Different frequency bands can be allocated to an uplink and downlink, with considering the asymmetry of the uplink and downlink, and transmission power requirement conditions of mobile stations and base stations.

[Industrial Applicability]

A frequency band allocation device and a frequency band allocation method according to the present invention can be utilized in mobile communications systems in which usable frequency bands are utilized for plural communications systems.

The present application is based on Japanese Priority Application No. 2004-275586 filed on Sep. 22, 2004 with the Japanese Patent Office, the entire contents of which are hereby incorporated by reference.

What is claimed is:

1. A frequency band allocation device comprising:
  a frequency band selection unit for selecting usable frequency bands from a dedicated frequency band, a registered frequency band and an unlicensed frequency band; and
  a frequency band allocation unit for allocating a frequency band out of the selected usable frequency bands to an uplink and downlink, so as to satisfy user required QoS,
  wherein plural utilizable frequency bands are allocated in the case that no one band satisfies the user required QoS; and when the plural utilizable frequency bands include both one broadband high frequency and one narrow band low frequency utilizable at a same time, the frequency band allocation unit allocates all of an uplink control channel, a downlink control channel and an uplink data channel to said one narrow band low frequency but not to the broadband high frequency, and allocates a downlink data channel to said one broadband high frequency but not to the narrow band low frequency,
  and wherein the uplink control channel and the downlink control channel are allocated to the same frequency band.

2. The frequency band allocation device as claimed in claim 1, further comprising:
  an RF environment recognition unit for detecting at least one item of usable frequency bands and bandwidths among the selected usable frequency bands, parameters of other system utilizing the selected usable frequency bands, interference from other mobile communication systems, propagation loss and shadowing;
  whereby
  the frequency band allocation unit allocates frequency bands to a user based on the detected result.

3. The frequency band allocation device as claimed in claim 1, further comprising:
  a user required QoS determination unit for determining at least one item of average transmission data rate, maximum transmission data rate, lowest guaranteed transmission data rate, delay, frame error rate and transmission power;
  whereby
  the frequency band allocation unit allocates frequency bands to a user based on the determined result.

4. The frequency band allocation device as claimed in claim 1, wherein
  the frequency band allocation unit allocates different frequency bands to the uplink and downlink, based on at least one of transmission characteristics and utilizable bandwidth of the selected usable frequencies.

5. The frequency band allocation device as claimed in claim 1, wherein
  the frequency band allocation unit allocates asymmetric bandwidths to the uplink and downlink, in accordance with traffic.

6. The frequency band allocation device as claimed in claim 1, wherein
  when plural allocatable frequency bands exist, the frequency band allocation unit allocates frequency bands based on traffic status to spread the traffic among the frequency bands.

7. The frequency band allocation device as claimed in claim 1, wherein
  when plural allocatable frequency bands exist, the frequency band allocation unit allocates frequency bands based on transmission power.

8. A frequency band allocation method, implemented on a frequency band allocation device, comprising the steps of:
  selecting, at a frequency band selection unit, usable frequency bands based on user information and frequency category information indicating a dedicated frequency band, a registered frequency band or unlicensed frequency band; and
  allocating, at a frequency band allocation unit, to an uplink and downlink, a frequency band satisfying user required QoS out of the selected usable frequency bands,
  wherein plural utilizable frequency bands are allocated in the case that no one band satisfies the user required QoS; and when the plural utilizable frequency bands include both one broadband high frequency and one narrow band low frequency utilizable at a same time, the frequency band allocation unit allocates all of an uplink control channel, a downlink control channel and an uplink data channel to said one narrow band low frequency but not to the broadband high frequency, and allocates a downlink data channel to said one broadband high frequency but not to the narrow band low frequency,
  and wherein the uplink control channel and the downlink control channel are allocated to the same frequency band.

9. The frequency band allocation method as claimed in claim 8, wherein
  the selecting comprises selecting different frequency bands to the uplink and downlink, based on at least one of transmission characteristics and utilizable bandwidth of the selected usable frequencies.

* * * * *